United States Patent [19]

Teron et al.

[11] Patent Number: 5,410,150
[45] Date of Patent: Apr. 25, 1995

[54] FIBER OPTIC CONTROLLER WITH AN INTERFACE HAVING AN EMITTING DIODE AND A PHOTODETECTOR

[75] Inventors: Allan L. Teron, Vancouver; C. Bruce Hewson, West Vancouver; Jeffrey Owen, Surrey, all of Canada

[73] Assignee: A. J. Leisure Group Ltd., Surrey, Canada

[21] Appl. No.: 6,773

[22] Filed: Jan. 21, 1993

[51] Int. Cl.6 .............................................. H01J 5/16
[52] U.S. Cl. ................................ 250/227.22; 250/229; 341/31
[58] Field of Search ............... 250/229, 227.22, 227.24, 250/227.28, 227.11; 341/31; 385/42, 52, 50, 14, 49

[56] References Cited

U.S. PATENT DOCUMENTS

| 1,957,585 | 5/1934 | Gratian . | |
| 3,340,401 | 9/1967 | Young | 341/31 |
| 3,937,952 | 2/1976 | Ripley et al. | 250/227.22 |
| 3,951,168 | 4/1976 | Roberts . | |
| 4,681,255 | 7/1987 | Drost . | |
| 4,814,600 | 3/1989 | Bergstrom | 250/227.22 |
| 4,854,498 | 8/1989 | Stayton . | |
| 4,935,621 | 6/1990 | Pikulski | 250/229 |
| 5,020,567 | 6/1991 | Proulx . | |
| 5,046,806 | 9/1991 | Kidder et al. . | |
| 5,090,791 | 2/1992 | Kidder et al. . | |

FOREIGN PATENT DOCUMENTS

| 2436499 | 2/1976 | Germany . |
| 62-261829 | 11/1987 | Japan . |
| 1287716 | 11/1989 | Japan . |
| 3178618 | 8/1991 | Japan . |
| 2075339 | 11/1991 | United Kingdom . |

Primary Examiner—David C. Nelms
Assistant Examiner—Que T. Le
Attorney, Agent, or Firm—John Russell Uren

[57] ABSTRACT

A fiber optic controller comprises a keyboard having a plurality of keys. Each key has a transmitting fiber and a receiving fiber wired therein. Light is provided to the transmitting fiber by a light emitting diode and travels to the key and, thence, to the receiving fiber by way of a reflective surface on the key which reflects the light when the key is in a depressed or "on" position. An electronic controller is controlled by signals from photo transistors which signals are initiated when light is transmitted by the receiving fiber to the photo transistor. The electronic controller, in turn, activates a power circuit which powers various of the operating components of a spa or hot tub.

8 Claims, 13 Drawing Sheets

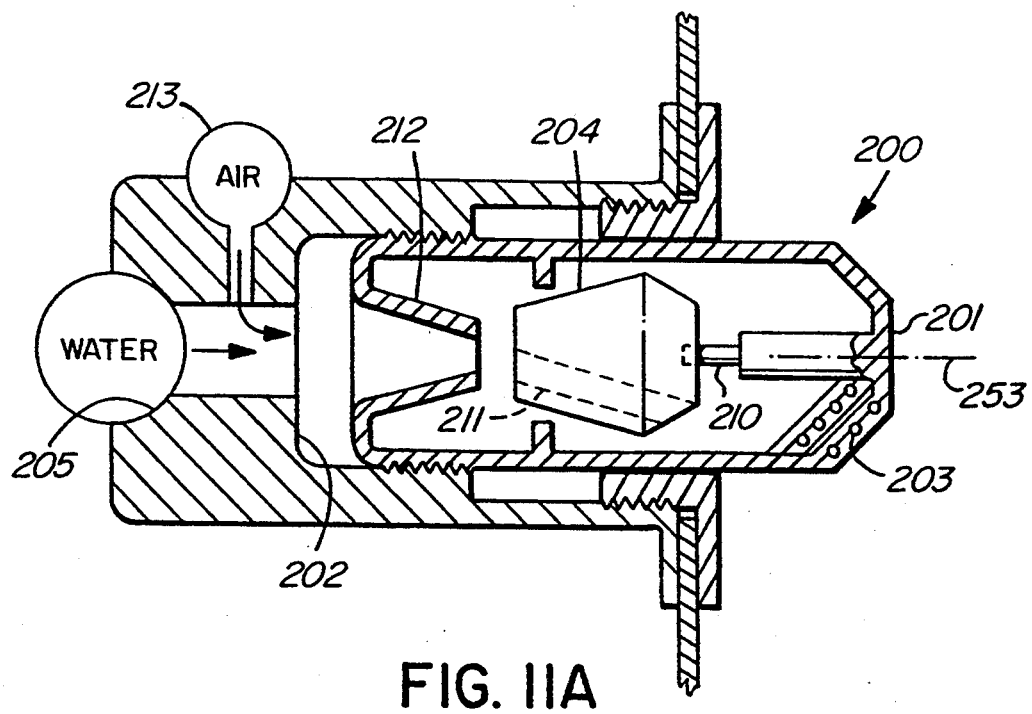
FIG. IIA
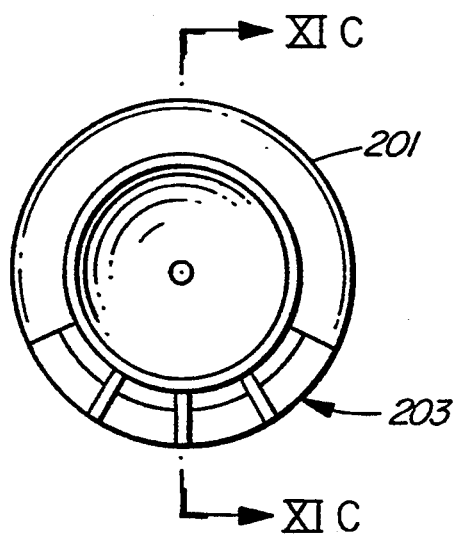
FIG. IIB
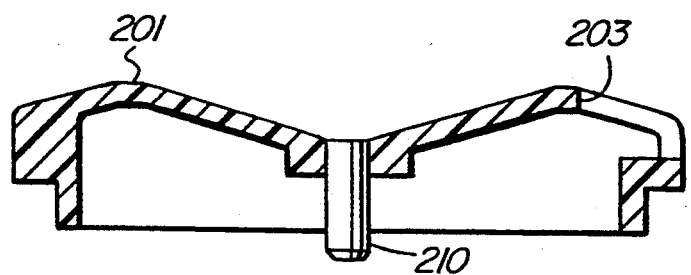
FIG. IIC

5,410,150

FIBER OPTIC CONTROLLER WITH AN INTERFACE HAVING AN EMITTING DIODE AND A PHOTODETECTOR

INTRODUCTION

This invention relates to a controller and, more particularly, to a controller utilizing fiber optic technology which is particularly applicable for use in a spa otherwise popularly known as a hot tub.

BACKGROUND OF THE INVENTION

The use of hot tubs or spas for recreation and therapeutic purposes has become pervasive over the last several years. Such tubs have various operating components, some of which include water and air jets, heaters, water pumps, air blowers and valves of different types which are used to initiate, terminate or modify fluid and air flow to the jets and the liquid used in the spa.

Such of such components are generally operated through manual or electrical controls. For example, air jets are typically operated manually through a rotating shaft type arrangement, the handle which may be turned by the user. The water pumps are typically operated electrically with appropriate controls provided for easy access by the user. The use of electrical power on a spa, however, particularly around the controls operated by a user, can create an unsafe or potentially deadly hazard because of the ability of leaking electricity to run through the user in order to seek a ground. This is particularly applicable to a spa since the water in a typical spa has enhanced conductivity because of the added chemicals.

In a typical spa, the user will manually rotate a handle which is ordinarily connected to a rheostat. The rheostat is used to control the power applied to the heater and line voltage is applied through the rheostat to the pump. The rotating handle is sealed from the rheostat by a rotating seal element but such seals are over time, the seal can deteriorate thus permitting current leakage. Although a ground fault interrupt circuit may be present on the spa, its operation is not guaranteed and, even if the GFI is operating correctly, there may still be injury or death caused to individuals who are particularly susceptible and sensitive to electrical current.

A further disadvantage with existing spas is the use of water or "neck" jets which typically eject water downwardly onto the neck of a user. These jets extend outwardly a distance from the wall of the spa and water is ejected inwardly back towards the wall in order to avoid water splash from the jets. Such inwardly sloping walls, however, are difficult to construct, particularly in a molding operation.

A further disadvantage with existing spas relates to the solenoid operated air valves. Typically, a vacuum will exist in the valve. The closure member will cover the orifice of the outlet through which the vacuum acts. When the closure member is opened by a solenoid, the solenoid must be powerful enough to completely and simultaneously remove the closure member from the orifice while the suction force is acting on the closure member across the area of the entire orifice. The power required to open such a closure member is unnecessarily large which results in a larger, more powerful and costly solenoid being used than is necessary.

The use of fiber optics can be desirable in many applications. For example, it may well be appropriate to separate power components in any operation from user operated switches because of the chance of electrical shock or because of the potential for a hazardous condition such as fire being present. Although fiber optics are typically used for transmitting light signals to a destination, using such fiber optics as control elements would be beneficial.

In utilizing fiber optics as control elements, the fiber optics must be appropriately wired or "fibered" to their respective switches and operating components. Typically a bundle of fibers is used. Since each of the fibers in the bundle requires an appropriate position, the process of determining which fibers are the relevant ones and the process of locating those relevant fibers can be tedious and time consuming in the fibering operation.

SUMMARY OF THE INVENTION

According to one aspect of the invention, there is provided a fiber optic controller comprising a keyboard, at least one key mounted in said keyboard, a transmitting fiber extending to each of said keys, a receiving fiber extending from each of said keys, an interface and an electronic controller being operable from said interface, said receiving and transmitting fibers being mounted in said interface, each of said keys having a reflective surface to reflect light between said transmitting fiber and said receiving fiber, said interface including at least one light emitting diode to provide radiation to said transmitting fiber and at least one photo transistor to detect radiation received by said receiving fiber.

According to a further aspect of the invention, there is provided an interface for a fiber optic controller, said interface comprising separable male and female members, at least one transmitting and receiving fiber mounted in one of said male or female members and at least one light emitting diode and photo transistor mounted in the other of said male and female members.

According to yet a further aspect of the invention, there is provided a key to reflect light between a transmitting optical fiber and a receiving optical fiber, said key having a base portion and a switch portion, said switch portion being movable relative to said base portion, one of said base and switch portions having a reflective surface to reflect light emitted from said transmitting fiber to said receiving fiber.

According to yet a further aspect of the invention, there is provided a fiber finder operable to allow the fibering of a plurality of keys on a keyboard each of which keys include a plurality of optical fibers, said fiber finder comprising an electrical keypad having a plurality of keys and being electrically connected to a controller, said keyboard being an optical key keyboard having said plurality of keys and being connected to said controller by a plurality of transmitting and receiving optical fibers, a transmitting and receiving fiber running to each of said keys of said optical switch keyboard, a plurality of light emitting diodes emitting visible light at a first frequency to said transmitting fibers and a plurality of light emitting diodes emitting visible light at a second frequency to said receiving fibers, each of said plurality of keys on said electrical keypad being operable to illuminate predetermined ones of light emitting diodes which emit visible light at said first frequency and said light emitting diodes emitting visible light at said second frequency, each of said plurality of keys on said keypad corresponding to a respective key on said optical switch keyboard following the wiring of said switches on said optical switch keyboard.

According to yet a further aspect of the invention, there is provided apparatus to initiate operation of at least one operating component powered by a first voltage, said apparatus comprising a manually operated control, means to obtain a control signal from said manually operated control, means to initiate operation of said operating component responsive to said control signal and means to electrically isolate said operating component powered by said first voltage from said manually operated control.

According to yet a further aspect of the invention, there is provided a solenoid operated air valve comprising a housing, an air inlet port extending into said housing, a flexible closure member covering said air inlet port and a solenoid operable to open and close said closure member, said solenoid acting on one side of said closure member and progressively removing said closure member from said air inlet port upon operation of said solenoid to allow progressively greater quantities of air through said air inlet as said closure member is progressively removed from said air inlet.

BRIEF DESCRIPTION OF THE SEVERAL VIEWS OF THE DRAWINGS

Specific embodiments of the invention will now be described, by way of example only, with the use of drawings in which:

FIG. 11A is a diagrammatic cross-sectional view of a pulsating neck valve according to the invention;

FIG. 11B is an enlarged view of the housing of the pulsating neck valve of FIG. 11A particularly illustrating the openings from which the water is emitted in a sequential pattern;

FIG. 11C is a cross-sectional view of the housing of FIG. 11A taken along the plane 11C—11C of FIG. 11B;

DESCRIPTION OF SPECIFIC EMBODIMENT

Figure 1:
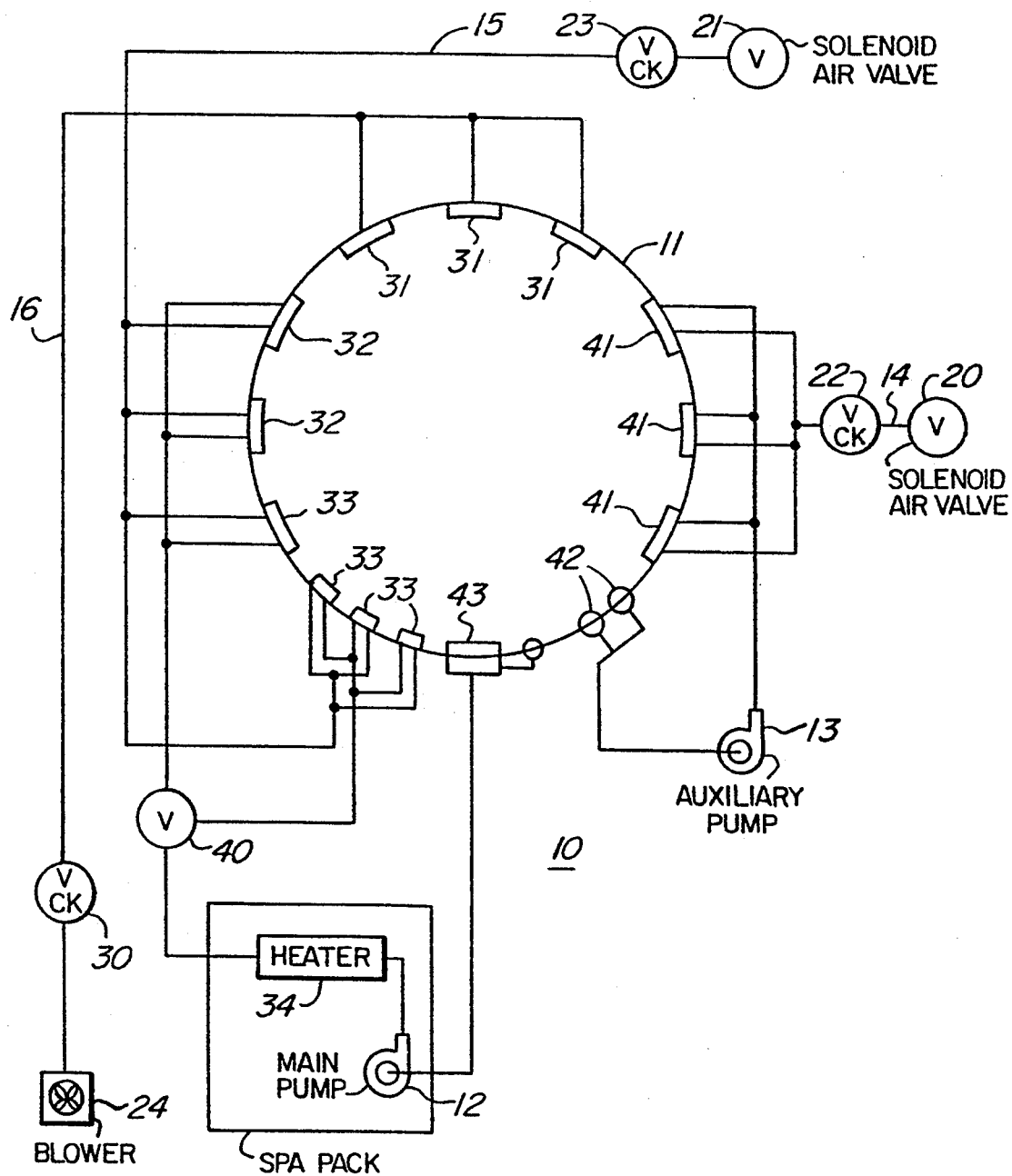
FIG. 1 is a diagrammatic plan view of the spa or hot tub according to the invention illustrating various of the operating components.

Referring now to the drawings, a hot tub or spa is illustrated generally at 10 in FIG. 1. It comprises an actual tub 11 used to hold the water to be heated in which a user will become immersed. It also comprises a main pump 12 and an auxiliary pump 13, air lines 14, 15 which are connected to atmosphere through solenoid air valves 20, 21, respectively, and through check valves 22, 23, respectively, which check valves 22, 23 function to prevent water backflow in the air lines 14, 15 which water could otherwise contaminate the air valves 20, 21 and an air blower 24 connected through a check valve 30 having a like function as check valves 22, 23 to a plurality of blower jets 31. Main pump 12 is connected to a plurality of water jets, namely the zone 1 jets 32 and the zone 2 jets 33. A heater 34 is provided to heat the water being pumped from the main pump 12 and a zone routing valve 40 directs the flow of the pumped and heated water to the zone 1 jets 32 or to the zone 2 jets 33 or to both in desired proportions as the user may decide. Main pump 12 receives water from the skimmer 43 mounted on the surface of the water in the spa 11 and a filter (not illustrated) is mounted within the skinner 43.

Auxiliary pump 13 directs water to a further series of zone 3 jets 41 and water for the auxiliary pump 43 is obtained from the suctions 42 which are located below the surface of the water in the spa 10. An air line 14 is connected to each of the zone 3 air jets 41 and directs air according to the solenoid air valve 20 as will be explained in greater detail hereafter.

Figure 2:
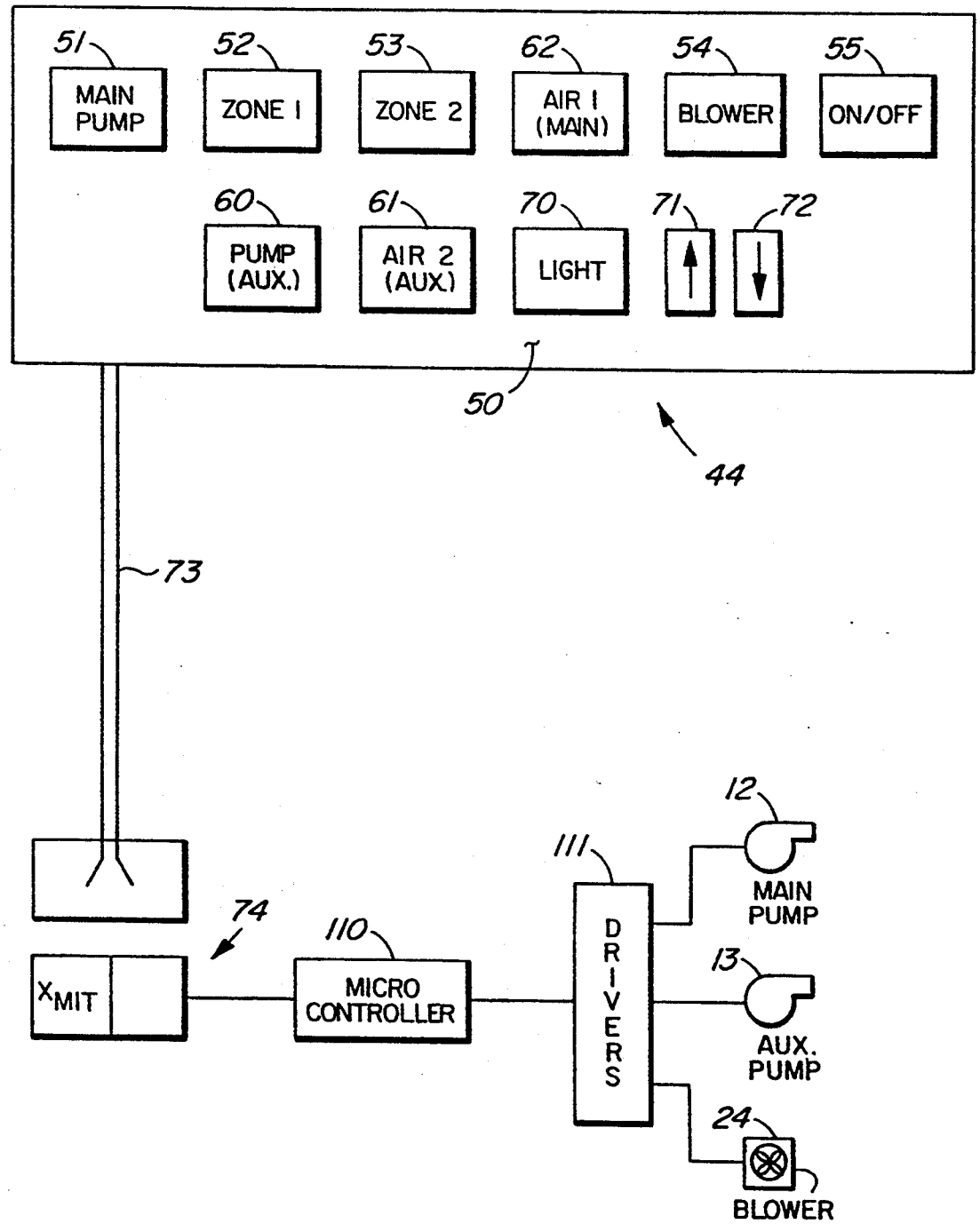
FIG. 2 is a diagrammatic view of the fiber optic controller and the keyboard according to the invention together with the electronic circuit, the power circuit and various of the operating components powered by the power circuit.

With reference to FIG. 2, an optical keypad used for the control operation is illustrated generally at 44. It comprises a membrane cover 50 with markings thereon which indicates each of the keys to be depressed in order to initiate operation of a particular component. The keys include a main pump key 51 used to initiate operation of the main pump 12, water jet keys 52, 53 to initiate operation of the zone 1 water jets 32 or the zone 2 water jets 33, respectively, through operation of the zone routing valve 40, blower key 54 to initiate operation of the blower 24 used to supply air to the blower or "bubble" jets 31 through check valve 30, auxiliary pump key 60 to initiate operation of the auxiliary pump 13 which provides water to the zone 3 water jets 41, auxiliary air valve key 61 which controls the air valve 20 and thereby provides air to the zone 3 air jet, and main air valve key 62 which operates the solenoid air valve 21 and thereby controls air to the zone 1 air jets 63 and the zone 2 air jets 64. A light switch 70 is provided to operate the lights (not illustrated) in the spa 10. The intensity of the illumination by the lights may be increased or decreased with keys 71, 72.

All of the keys in the keypad 44 are fiber optic type switches. Each key, when depressed through the membrane cover 50, acts to reflect light passing through a single fiber of the fiber optic bundle 73 which runs from the keypad 44 to a connector generally illustrated at 74, all of which will be explained in greater detail.

The fiber optic bundle 73 is connected to the connector 74. The connector 74 converts the light signal to an electrical signal. The electrical signal is converted to power which operates the appropriate component or components of main pump 12, auxiliary pump 13 or blower 24.

A typical key, in this case the main pump key 51 in the keypad 44 is illustrated more particularly in FIG. 3. Key 51 has a generally square configuration with a movable switch portion 80 which pivots about axis 81 on a base 82. A raised portion 83 is provided on switch portion 80 and the raised portion 83 is adapted to contact the underside of the membrane 50 overlaying the key 51 and to move downwardly when the area on membrane 50 which is above the raised portion 83 is pressed by a user. The raised portion 83 and the switch portion also has a reflective concave surface 84 formed therein which is designed to reflect light passing from the transmitting fiber entering key 51 to the receiving fiber leaving key 51 as seen more clearly in FIG. 3E. The reflective surface 84 is chromium coated or suitably finished to improve reflectivity.

Figure 3A:
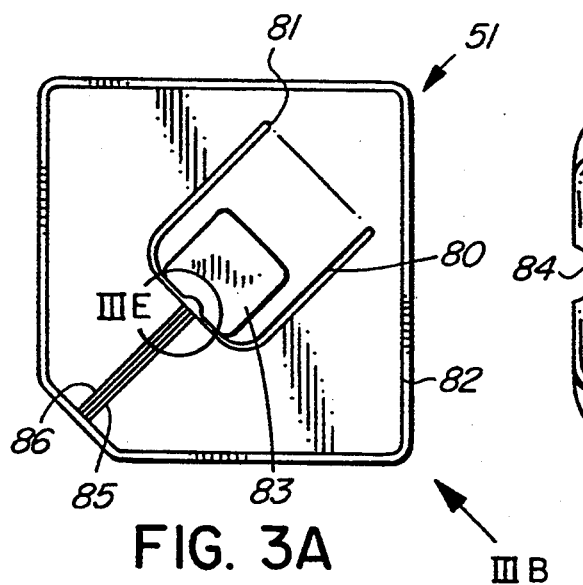
FIG. 3A is a plan view of the fiber optic key according to the invention.
Figure 3C:
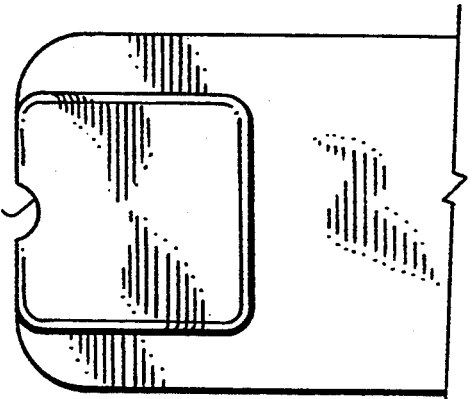
FIG. 3C is a plan view of the switch portion of the key of FIG. 3A.
Figure 3B:
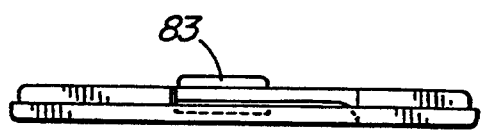
FIG. 3B is a side view of the key of FIG. 3A.
Figure 3D:
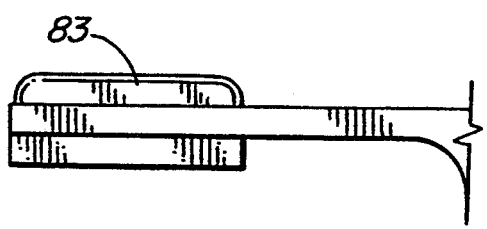
FIG. 3D is a side view of the switch portion of FIG. 3C.
Figure 3E:
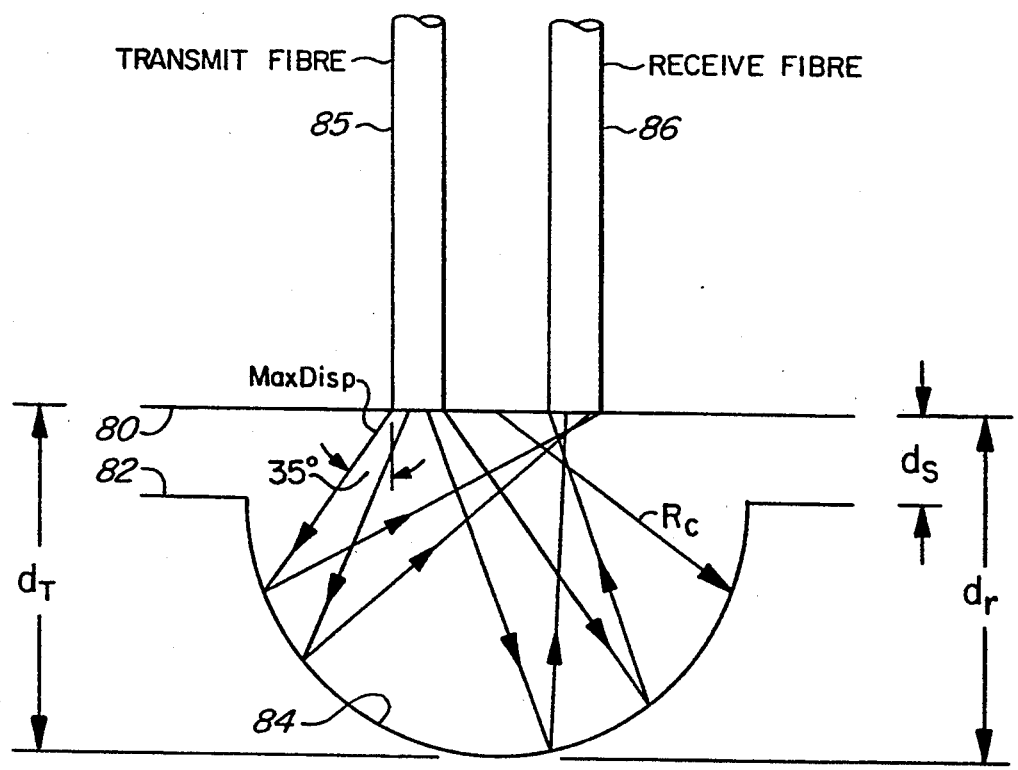
FIG. 3E is an enlarged plan view of the area IIIE of FIG. 3A.
Figure 4A:
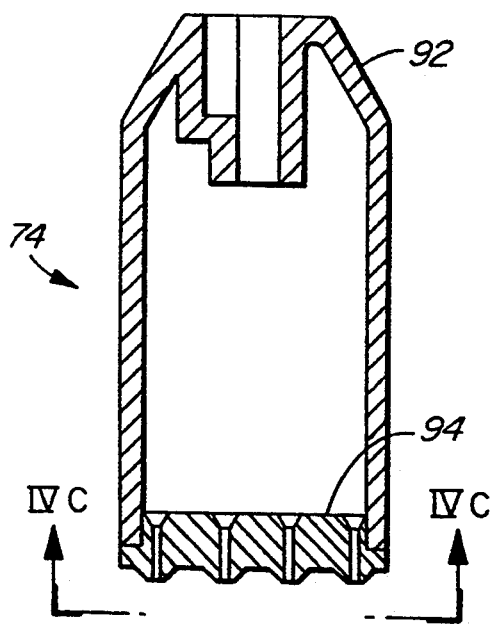
FIG. 4A is a side, cross-sectional exploded view of the interface or connector according to the invention.
Figure 4B:
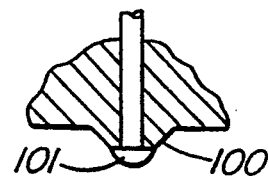
FIG. 4B is an enlarged view of the cylindrical protuberance into which a typical optical fiber is mounted, which protuberance extends towards the light emitting diodes mounted in the connector.
Figure 4C:
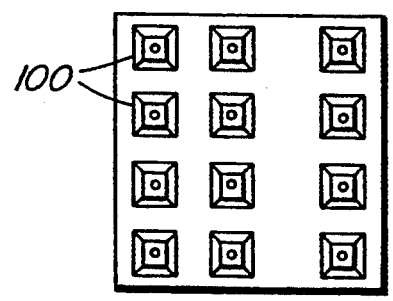
FIG. 4C is a bottom view of male member of the connector taken along IVC—IVC of FIG. 4A.
Figure 4D:
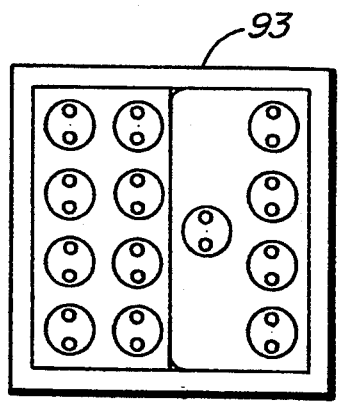
FIG. 4D is a bottom view of the female member taken along the plane IVD—IVD of FIG. 4A.
Figure 4E:
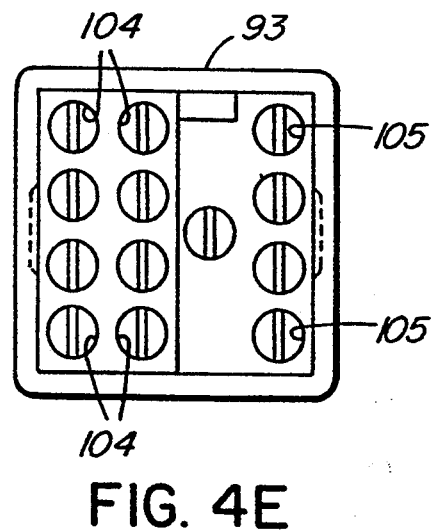
FIG. 4E is a view taken along the plane IVE—IVE of FIG. 4A.

The radius of curvature $R_c$ of the reflective surface 84 is designed to reflect the light transmitted from the transmitting fiber 85 back to the receiving fiber 86 as illustrated in FIG. 3E. A further variable is the distance between the movable switch portion 80 and the base 82. It is clear that the closer the base 82 is to the movable switch portion 80, the more integrity the light enamating from the transmitting fiber 85 will have when reflected to the receiving fiber 86. However, manufacturing tolerances must also be considered in order that the tolerances are sufficient to allow the key 51 to be conveniently manufactured.

Two formulas are relevant. The first relates to the dispersion angle ($MaxD_{isp}$) of the light which emanates from the transmitting fiber:

$$\text{MaxDisp} = \arctan \frac{N_{air}}{N_{fiber}} = \arctan \frac{1}{1.4}$$

where N is the index of refraction of the material

The second formula relates to the radius of curvature ($R_c$) of the reflective surface 84:

$$\frac{2}{R_c} = \frac{1}{d_T} + \frac{1}{d_r}, \text{ for positions close to the center line}$$

where $d_t$ is the distance of the transmitting fiber and $d_r$ is the distance of the receiving fiber from the mirror.

These results are optimum results and, of course, do not take into consideration the manufacturing tolerances which must be of consideration.

Two recesses 90, 91 in the form of grooves are formed in the base 82 of the key 51. Both recesses 90, 91 are of a size to allow a light transmitting fiber to be press fitted therein. The fibers terminate at the beginning of the switch portion 80 and at a height below the height of the concave reflective surface 84 such that the light from the transmitting fiber reflects off the surface 84 to the receiving fiber if the key 51 is depressed. If the raised portion 83 is not depressed, the light beam is not reflected and no light passes to the receiving fiber.

The connector or interface 74, best illustrated in FIG. 4, is used to transmit radiation from respective LED's mounted in the connector 74 to the keypad 51 by the transmitting fiber and, thence, to receive light by photo diodes from the receiving fiber passing from key, as shown in more detail in FIG. 4. The connector or interface 74 includes male and female connectors 92, 93, respectively. The base 94 of the male connector 92 contains a plurality of conical protuberances or extensions 100 which each have a single fiber running to or from each of the keys on the keypad 44. The fibers are all cut flush with the lower end of the cones 100 and these ends are conveniently coated with an optically clear epoxy or are varnished so that a convex "lens" 101 is formed on the bottom of the cones 100 as seen more particularly in FIG. 4B. This "lens" is useful to concentrate the light as more specifically explained hereafter.

A plurality of light emitting diodes are used as transmitters 102 and are positioned in the female connector 93. Each of the light emitting diodes 102 and its associated fibers are isolated in respective compartments, a typical one of the compartments being illustrated at 104 in FIG. 4A. The purpose of the compartments is to isolate each fiber and its respective light emitting diode so that no extraneous light is fed or seen by an adjacent LED and any "noise" is thereby not generated over the transmitting fiber or an adjacent photo transistor. Likewise, the photo transistors and their associated fibers are also isolated from the remaining photo transistors and their associated fibers so that a minimum of extraneous radiation is received by any single photo transistor.

The transmitting fibers and the transmitting LED's 104 are illustrated on the left hand side of the male and female member 93. The receiving fibers and the photo diodes 105 are located on the right hand side of the female and male connector 93, respectively.

Up to four (4) fibers can be used for each of the transmitters in female member 93. That is, up to four (4) fibers can run into each cone 100 from the fiber bundle 73. Thus, one LED 102 can be used to provide the light signal to the fibers which run to one or more of the keys 51 on the keypad 44 which are operably connected to the specific transmitting and receiving fibers.

The control system which is electrically isolated from the keypad 44 by the interface 74 is generally illustrated at 104. It comprises a microcontroller 110 which is connected to the keypad 44 through the fiber optic cable 73 and the interface 74. A plurality of device drivers 111 are connected to the microcontroller 110, the device drivers 111 being operable to directly drive a plurality of SCRs 112 and to indirectly drive a plurality of TRIACs 113 via a plurality of opto-isolators 114. The device drivers 111 are also operable to receive low voltage power in the range of 5 v. via an interlock 120. A thermal cutout 121 senses the operating temperature of the heater 34 (FIG. 1) which heats the water pumped to the spa 10 and a pressure cutout 122 senses the fluid pressure in the heating device. A thermal sensor or probe 123 senses the actual temperature of the water in the spa 10 and is connected to the microcontroller 110 and to the device drivers 111 through a temperature control sub-circuit 124. A powerline current zero-crossing sensor 130 is connected to the microcontroller 110 and a loudspeaker 131 is connected to the microcontroller 110 through an amplifier 132 and a digital to analog converter 133. All electrical current supply lines to and from the control system 104 and the controlled devices pass through the sensor coil of a ground fault interrupter (GFI) 135, the GFI 135 also being responsive to a test trip signal initiated by the microcontroller 110.

Figure 6:
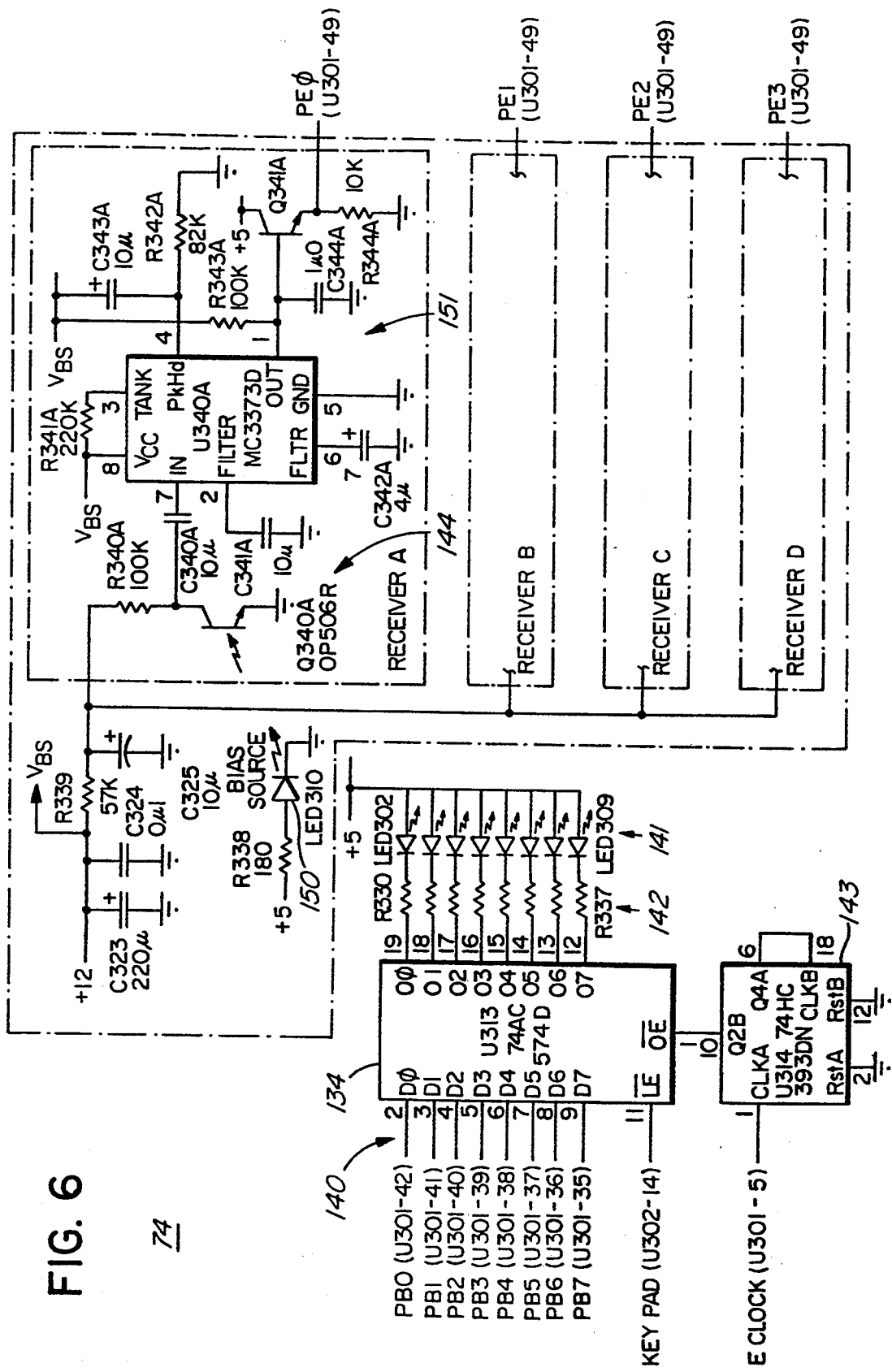
FIG. 6 is a schematic of the fiber optic interface of FIG. 5.

With reference to FIG. 6, the fiber optic interface 74 is illustrated in more detail. It comprises an LED driver 134 operable to receive control signals from the microcontroller 110 by an address bus generally illustrated at 140. A plurality of LEDs generally illustrated at 141 are connected to LED driver 134 through a plurality of series resistors 142, each of the plurality of LEDs 141 being operable to transmit light through a set of optical fibers within fiber optic cable 73 (FIG. 2). A modulating clock 143 is connected to the enable pin of the LED driver 134 and a plurality of phototransistor networks generally illustrated at 144 are operable to receive light carried by a set of optical fibers within the fiber optic cable 73 and convert the light into an electrical signal. A constant LED 150 is operable to optically bias the phototransistor networks 144 and a plurality of signal discriminators 151, such as the MC3373 integrated circuit are each operable to discriminate in the output signal of one of the plurality of phototransistor networks 144 between noise and a signal and to initiate a signal to the microcontroller 134 upon detecting a signal.

Figure 5:
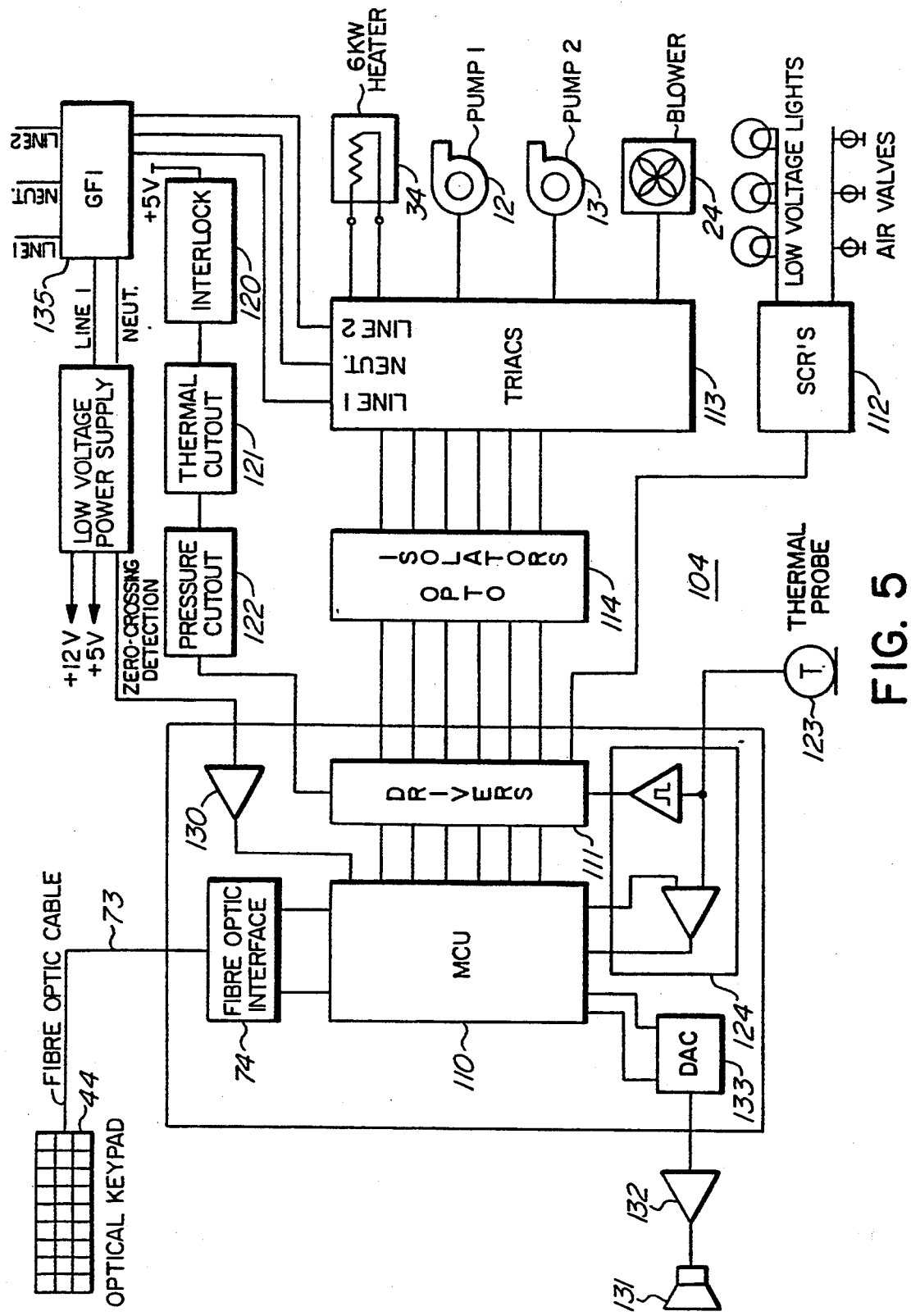
FIG. 5 is a schematic of the interface, the electrical and power control systems and various of the operating components of the spa.
Figure 7:
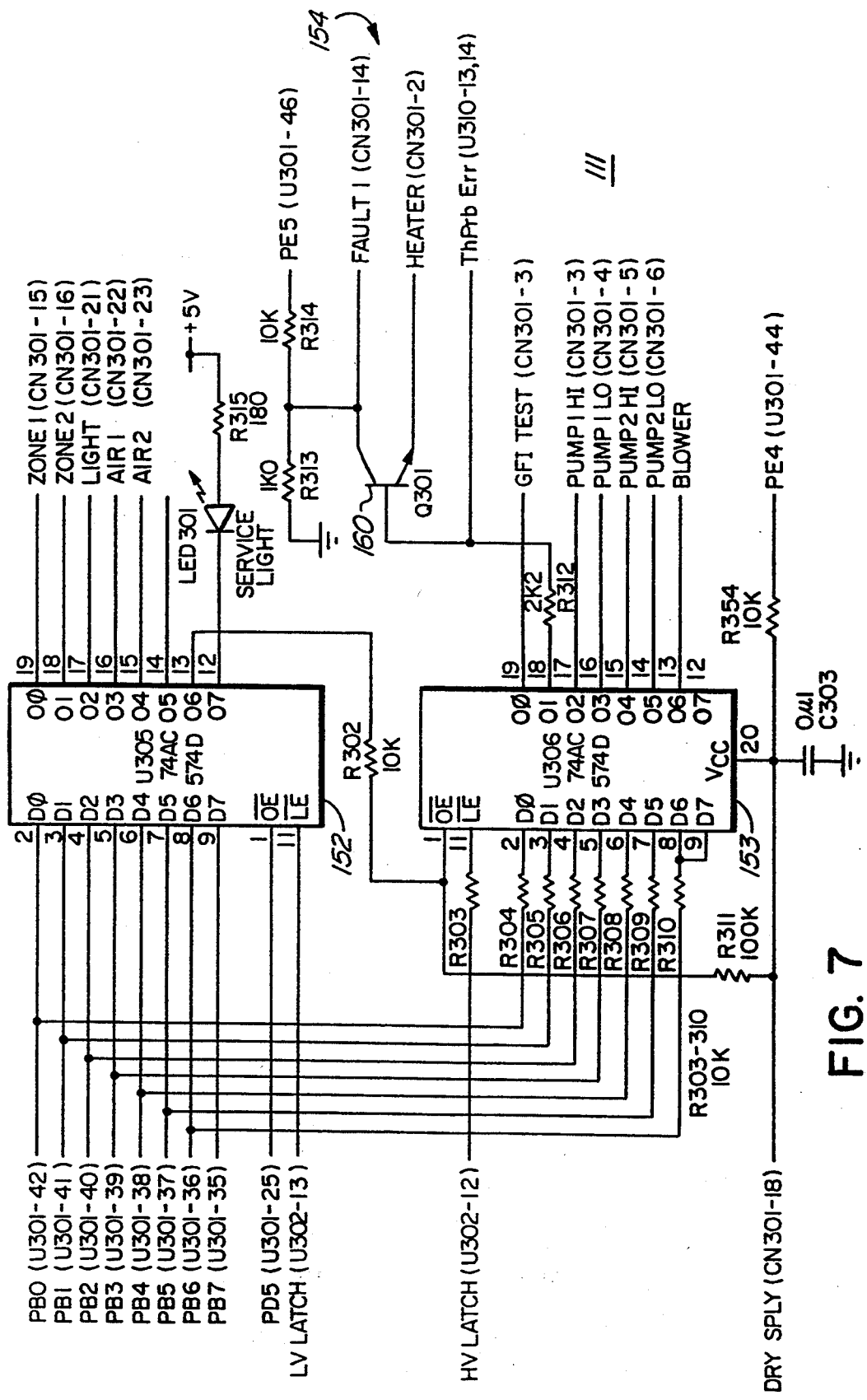
FIG. 7 is a schematic of the device drivers and their related circuitry of FIG. 5.

With reference now to FIG. 7, the device drivers 111 (FIG. 5) are illustrated in greater detail. The device drivers 111 comprise a plurality of low voltage latches 152 and high voltage latches 153, each of the latches 152, 153, being operable to receive and maintain a control signal from the microcontroller 110. A plurality of sensor feedback networks generally illustrated at 154 each include a latch output transistor 160 which is operable to alter the normal output of the latches 152, 153 according to sensed conditions.

Figure 8:
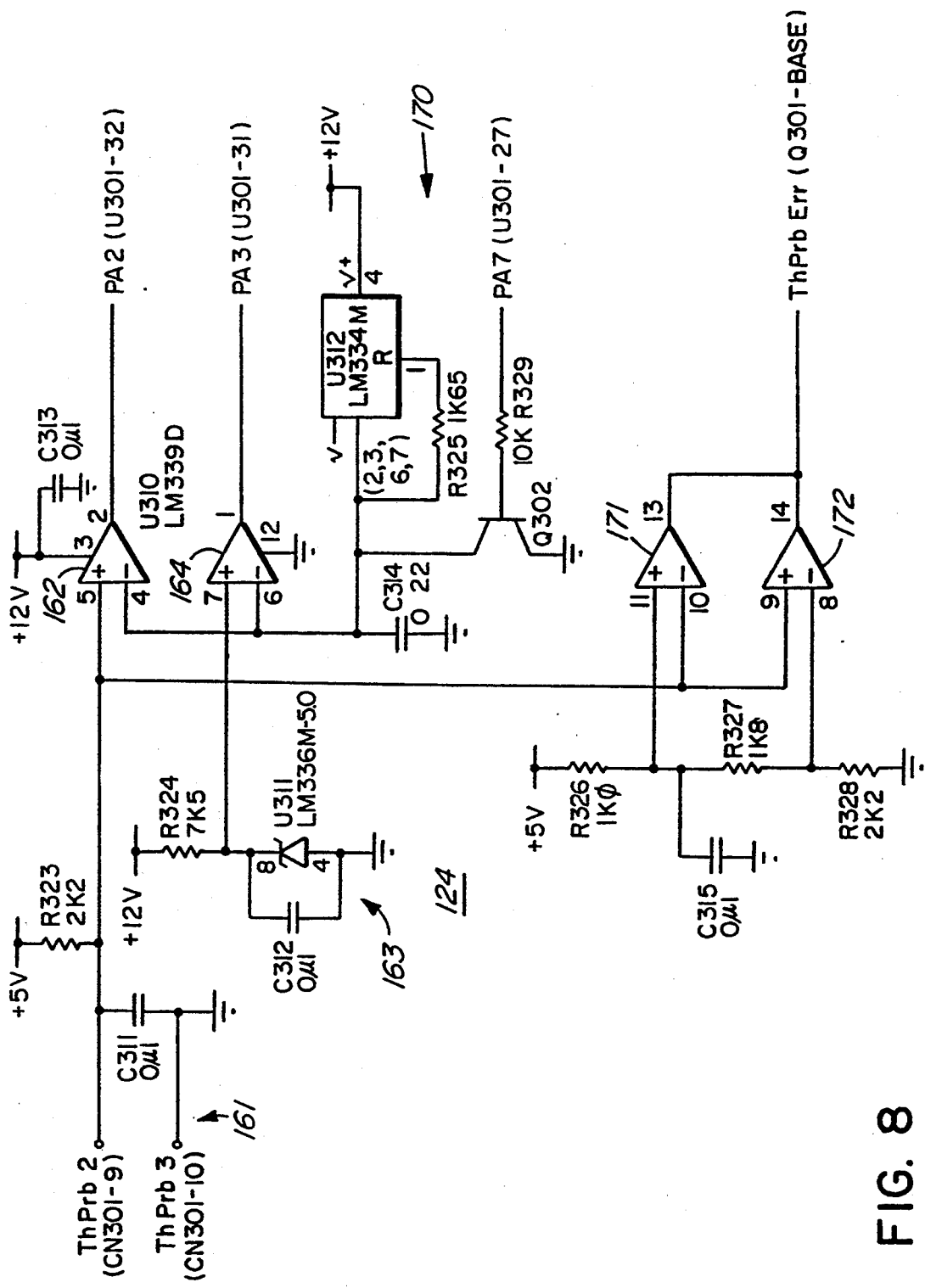
FIG. 8 is a schematic of the temperature control subcircuit and related components of FIG. 5.

With reference to FIG. 8, the temperature control sub-circuit 124 is illustrated in greater detail. It comprises a test signal input node generally illustrated at 161 operable to accept a test signal from the thermal sensor 123 (FIG. 5) and to supply the test signal as a first input to a first comparator 162, the first comparator 162 initiating a timer first trigger in the microcontroller 110. A reference temperature circuit generally illustrated at 163 supplies its reference signal as a first input to a second comparator 164. The second comparator 164 initiates a timer second trigger in the microcontroller 110. A ramp, function generator generally illustrated at 170 supplies its signal as a second input to the first comparator 162 and as a second input to the second comparator 164. A maximum limit comparator 171 accepts the test signal from input node 161. A minimum limit comparator 172 accepts the test signal from input node 161. Each comparator 171, 172 compares the test signal to a preset limit and initiates an error condition if the test signal falls outside the preset maximum or minimum limit.

Figure 9:
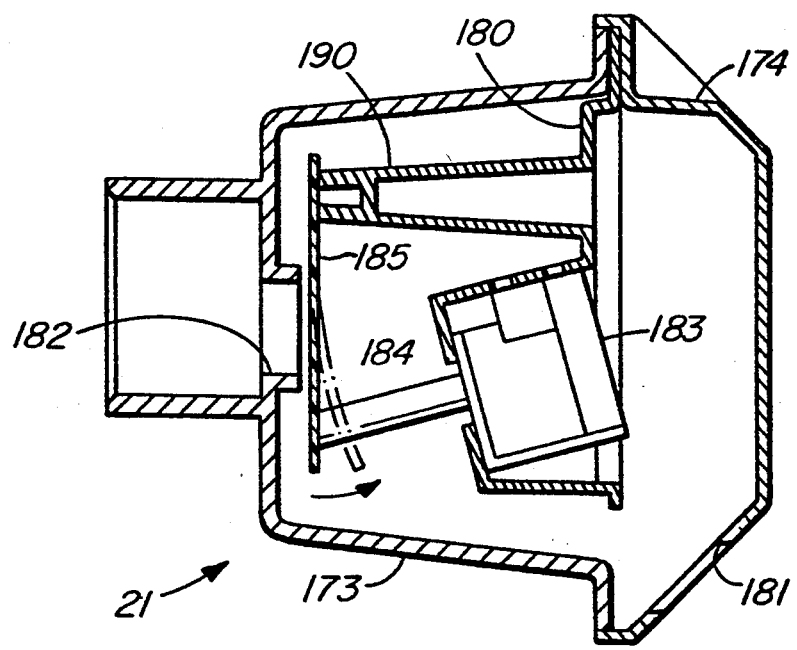
FIG. 9 is a cross-sectional view of a solenoid operated air valve according to the invention.

A solenoid operated air valve generally illustrated at 21 is illustrated in greater detail in FIG. 9 which air valve is also representative of air valve 20. It comprises a housing or main body 173, a cap 174 connected to the main body 173 and an inner valve and solenoid holder 180 which is mounted between the periphery of the cap 174 and the main body 173. Cap 174 is open to atmosphere by way of openings 181 and a flexible valve or closure member 185 is mounted to the valve and solenoid holder 180. A piston or plunger 184 extends from the windings of a solenoid 183 and is connected adjacent the end of the flexible valve 185 distant from the end of the flexible valve 185 which is hingedly mounted to the cantilevered arm 190 of the valve and solenoid holder 180. The material of the closure member 185 is polyurethane material and a thickness of 0.060" has been found convenient to provide the necessary flexibility as will be described.

Figure 12A:
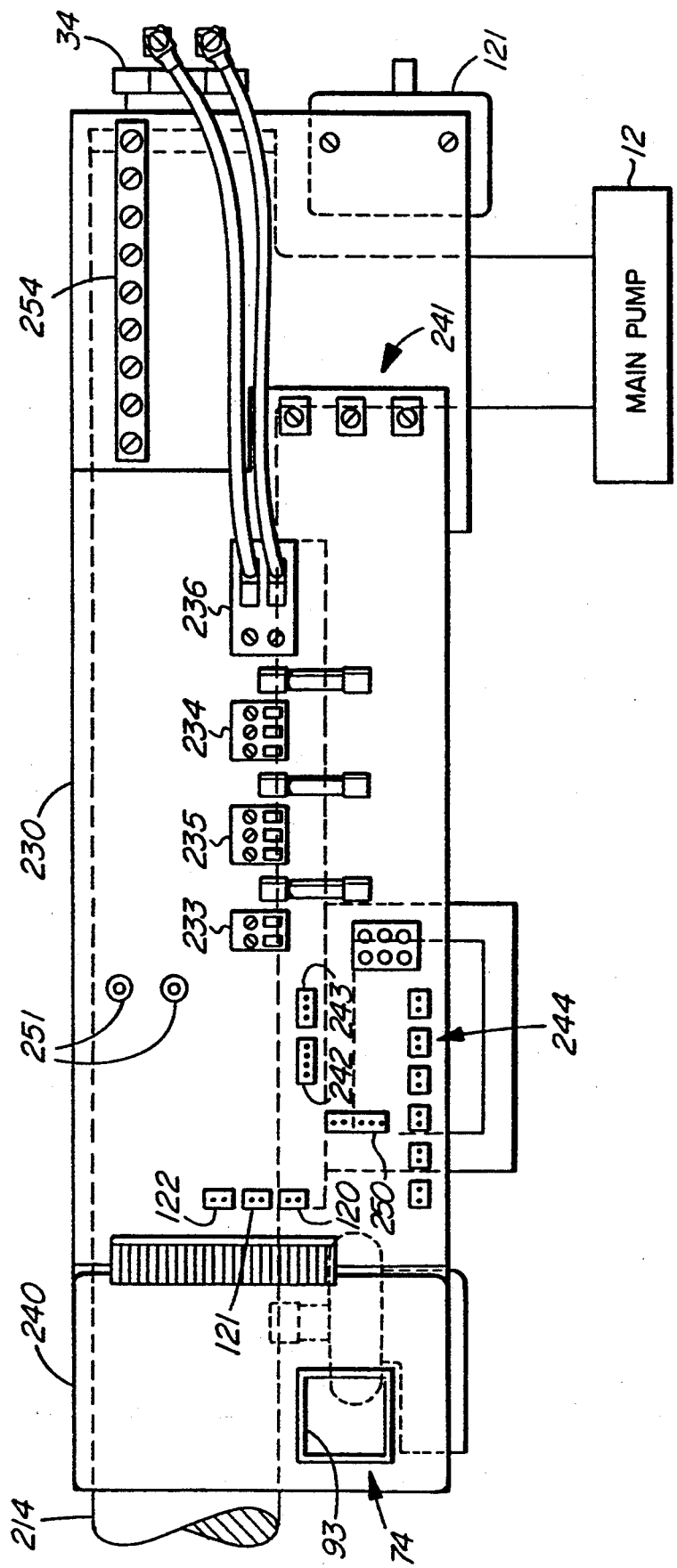
FIG. 12A is a front view of the mounting of the controller and heater housing assembly.
Figure 12B:
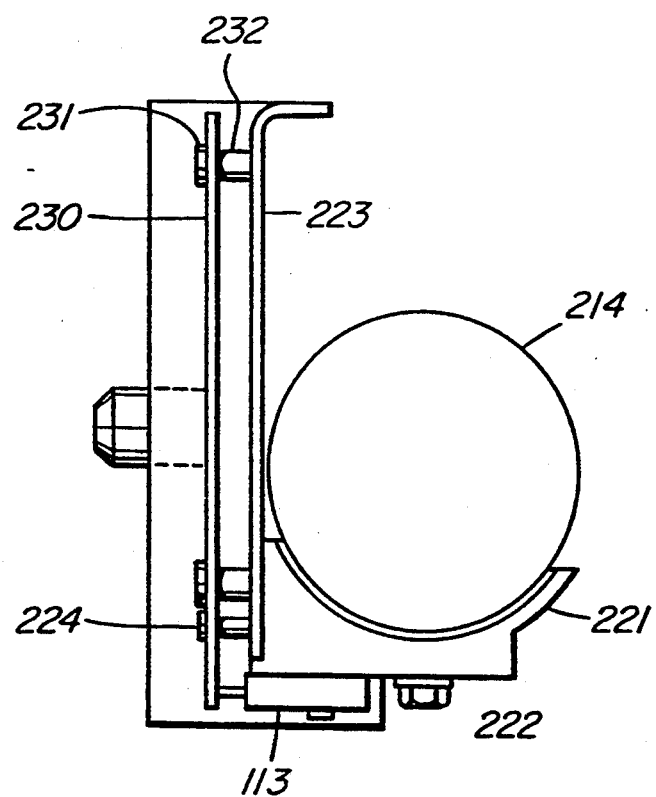
FIG. 12B is a side view of the mounting assembly of FIG. 12A.

The actual hardware and its mounting position is illustrated in FIGS. 12A and 12B. The heater 34 is connected within the heater housing 214 and water tunnels through the housing 214 to the spa 10. The heater housing 214 is mounted on a mounting bracket 221 by cap screws 222. A mounting plate 223 is also mounted to the bracket 221 by self typing screws 224. A power board 230 is connected to the mounting plate 223 by respective bolts 231 and spaces 232.

The pressure sensor is mounted within conduit 214 to sense the pressure of the water within the conduit 214. If water is not present, the pressure sensor 122 will terminate the operation of the heater 34.

The thermal cutout 121 is also mounted within the water conduit 214 and in the event the heater 34 exceeds a predetermined temperature, the heater 34 will be shut down by the action of the thermal cutout 121.

The interlock 120 is mounted in the power board 230. The interlock 120 is manually operated and is used to isolate the power components from the control circuit in the event, for example, work is being prepared on components of the system such as the key pad 44 or is otherwise being conducted.

The TRIACS 113 and the SCR's 112 are mounted on the bottom of the mounting bracket 221. This is so that the heat generated by these components finds a heat sink in the water passing through the heater housing 214. The connection of the blower 24, the main pump 12, the auxiliary pump 13 and the heater 34 are located on the power board 230 at 233, 234, 235, 236, respectively. The micro-controller module 240 which comprises the microcontroller 110 and the drives 111 is mounted adjacent the power board and the female member 93 of the interface 74 is positioned so that the male member 92 of the interface 74 may simply be inserted. The power mains 241 are mounted on the power board 230 and power is applied to the main pump 12 through the main 241 and main pump connection 234. The thermal cutout 121 is also mounted on the power board 230.

A series of pin connections are also provided on the power board 230. Attachment pins 242 are provided for an approach sensor (not illustrated) used to sense approaching users. The approach sensor is intended to turn on the lights (not shown) of the spa 10 in the event it is dark and attachment pins 244 are also provided for such lights. Attachment pins 243 are also provided for the zone valve 40 and attachment pins 250 are provided for the air valves 20, 21. Jacks 251 are provided for the speaker 131. Ground bus 254 is also provided for ground contact by the power operating components including main pump 12, auxiliary pump 13 and blower 24.

Figure 10:
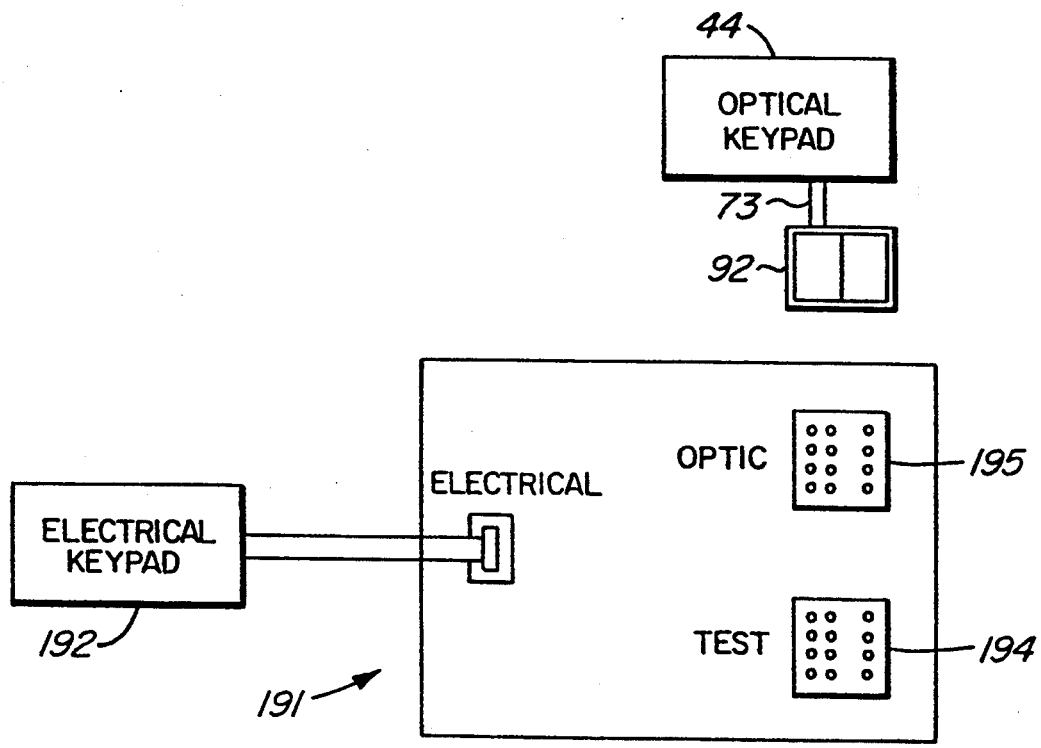
FIG. 10 is a diagrammatic view of the components making up the fiber finder according to the invention.

A fiber finder is generally illustrated at 191 in FIG. 10. The fiber finder 191 is used to properly wire or "fiber" the optical keypad 44 so that the correct operating functions of the spa 10 result when a particular key on keypad 44 is depressed. In the fiber finder 191, a plurality of light emitting diodes ("LED's") used as transmitters in the optic socket 195 of the fiber finder 191 emit green radiation and will illuminate up to eight (8) fibers extending to the keypad 44 from each LED. A series of LED's in the optic socket 195 which represent the photo transistors in the interface or connector 74 emit red radiation and illuminate up to four (4) fibers running to the optical keypad 44, according to the key being depressed on the electrical keypad 192. When, for example, a key on the electrical keypad 192 is depressed, a microprocessor in the fiber finder 191 will illuminate the correct LED's to be illuminated. This will result in a plurality of fibers being illuminated at the keyboard 44 by the red emitting LED's and by the green emitting LED's in the optic insert socket 195. The correct key on the optical keypad 44 is then wired or fibered by the assembler or technician taking one of the green coloured fibers and pressing it into the transmitter recess 90 (FIG. 3A) of the key 51. He will then take one of the red coloured fibers and likewise press it into the receiver recess 91 of the key 51. A sharp edge trims the fibers which extend from the recesses adjacent the concave surface 84. The first key is then properly fibered or wired.

Likewise, the technician will then push the second key on the electrical keypad 192 which will, in turn, and as instructed by the microprocessor in the fiber finder 191, illuminate a particular red and green LED combination for the second key on the optical keypad 44. The second key in the optical keypad 44 will be wired in the same way as was the initial key. This procedure will continue until all of the keys on the optical keypad 44 have been properly fibered.

Following the completion of the fibering, the fiber bundle 73 together with the male member 92 is then plugged into the test socket 194 of the fiber finder 191. The test socket 194 has been previously wired and contains a microprocessor which will indicate, by way of an audio signal, the particular key of the optical keyboard 44 which is then being depressed. For example, when a particular key is being depressed, an audio signal would advise that, for example, "key 3" is being depressed.

Reference is now made to FIGS. 11A-11C where a pulsating neck jet is generally illustrated at 200. The jet comprises a housing 201 which is threadedly mounted within a receptacle 202, the receptacle 202 having water emitting areas 203. A water distributor or rotor 204 is mounted on a shaft 210 which is integral with the housing 201. The rotor 204 has an internal channel 211 offset to the axis 253 of shaft 210 so that when water is emitted from the nozzle area 212, the water enters the channel 211 and drives the rotor 204. An air intake 213 is also provided. The air intake 213 allows a mixture of air and water to be emitted by the rotor 204 and sequentially through the water emitting areas 203 of the housing 201, thus resulting in the pulsating action.

Operation

The ground fault interrupt circuit 135 (FIG. 5) constantly monitors the current passing through the supply lines. These currents should must sum to zero. If the GFI 135 detects a non-zero condition, a circuit breaker (not illustrated) located remotely from the spa 10 with the GFI 135 is immediately opened to terminate all line voltage flow to the spa 10. Otherwise and during normal non-operation of the spa 10, low voltage will continue to operate the control circuit.

The microcontroller 110 will monitor the number of days, conveniently three (3) months, that have passed and upon a predetermined number passing or when the spa 10 is refilled, the microcontroller 110 will initiate a signal to one of the TRIACS 113 when the ON-OFF switch 55 is initially depressed. The TRIACS 113 will be instructed to create a ground fault by injecting a low level AC current to the ground circuit. In the event the breaker immediately opens, the test is presumed to be successful and the microcontroller 110 will allow operation of the ON-OFF switch 55 to provide full line voltage operating functions to the spa 10. If, however, the circuit breaker does not open, the microcontroller 110 will immediately shut down all flow of power to the spa 10 and control circuit 104.

To provide the proper signal to the GFI 135 following refilling of the spa 10, it is contemplated that a pressure transducer (not illustrated) could be conveniently placed in the housing of the heater 34. When the spa 10 is refilled, the pressure transducer would sense air in the heater 34. The pump 12 could be operated at low speeds by the low voltage of the control circuit 104 for a predetermined period of time and a predetermined number of times. If the air was not removed, the pump 12 would be required to be manually drained. In addition, the detection of air by the pressure transducer in the heater 12 would initiate operation of the test of the GFI 135. It is further contemplated that a temperature transducer could be utilized which would sense a rapid temperature change in the welter of the spa 10 which could only happen if the spa 10 was drained and refilled. This transducer would signal the microcontroller 110 which would then, again, initiate the test of the GFI 135.

The microcontroller 110 initiates an internal timer to measure the response time of the GFI 135 during test. If the GFI 135 interrupts power to the control circuit 104, including the microcontroller 110, within a predetermined critical time, the GFI 135 is considered to be operating acceptably. If the GFI 135 does not interrupt power within the predetermined critical time, the microcontroller 110 detects that the internal timer has exceeded that critical time and that the GFI 135 is not functioning properly. In this latter event, it will terminate all flow of power to the spa 10 and the control circuit 104.

Assuming that the GFI 135 is properly operating, the optical keypad 44 will be scanned as the microcontroller 110 (FIG. 5) instructs the LED driver 134 (FIG. 6) to sequentially illuminate each of the plurality of LEDs 141 in the interface 74. A modulating clock 143 toggles the enable line of the LED driver 134 so as to modulate the plurality of LEDs 141 at a frequency sufficient to distinguish their emissions from optical noise such as fluorescent light and the like. A convenient modulation frequency to be used is in the order of 30 KHz and, more particularly, 31.25KHz.

In turn, the light from each of the plurality of LEDs 141 in the interface 74 travels through specific ones of the bundle of fibers 73 in fiber optic cable 73 to optical keypad 44. If the key at the keypad 44 is not depressed, the light will emerge from the end of the fiber and scatter and at the interface or connector 74 of the corresponding receiving fiber, only optical noise will emerge to be detected by the corresponding phototransistor network 144. The signal discriminating means 151 will classify the signal as mere noise and will not inform the microprocessor 110 that a key has been depressed.

If, however, the key such as key 55 is depressed, the mirror surface 84 (FIG. 3) will be placed in the plane of the light emerging from the transmitting optical fiber. The light emitted will be reflected by the mirror surface 84 and redirected through the receiving optical fiber to the fiber optic interface or connector 74 to impinge upon one of the plurality of phototransistor diodes 144. This phototransistor network 144 is biased by the constant LED 150 to be sensitive, as earlier stated, to the difference between noise and a faint correct signal in the midst of the noise. The signal discriminator 151 detects this amplified signal amid the noise and instructs the microcontroller 110 that a key has been depressed. By keeping track of which of the plurality of LEDs 141 and which of the plurality of phototransistor networks 144 are operating together, the microcontroller 110 determines which key was depressed, in this case the on-off switch 55.

To ensure the ground fault interrupt ("GFI") 135 is functioning properly, the microcontroller 110 will test it each time the spa 10 is refilled. The timing of this test is intended to be convenient, that is the test is completed automatically and at a time when the user is not in the spa.

When the microcontroller 110 determines the identity of the key being depressed, it instructs one of the plurality of device drivers 111 (FIG. 5) to alter the operation of its respective controlled device or controlled component such as main pump 12, auxiliary pump 13 a blower 24, through the opto isolators 114 and TRIACS 113 or directly through the SCR's 112. The device driver 111 registers the instruction and initiates a trigger signal to directly trip the device SCR or indirectly trip the device TRIAC through one of opto-isolators 114. A feedback network 154 (FIG. 7) is included such that the output of the high voltage latch 153 that controls the heater 34 must pass through a transistor 160 whose bias is controlled by the thermal sensor 123 (FIG. 5), the thermal cutout 121, the pressure cutout 122 and the interlock 120.

If, for example, the device driver 111 registers an instruction to initiate operation of the main pump 51, the main pump will provide water to the zone 1 jets 32 and to the zone 2 jets 33, the water passing through heater 34, the temperature of which is adjustably controlled by appropriate keys (not shown) on the keyboard 44 and through a zone routing valve 40 which, by adjustment, determines the correct diversion of flow between the zone 1 water jets 32 and the zone 2 water jets 33.

The user may desire to initiate operation of the zone 1 air jets 63, the zone 2 air jets 33 and/or the zone 3 air jets 41. This is accomplished by depressing keyswitch 62 which is intended to initiate operation of the solenoid air valve 21.

Reference is now made to FIG. 9 wherein the solenoid air valve 21 is illustrated. Due to the venturi effect of the zone 1 water jets 32 and the zone 2 water jets 33, a suction is created at air inlet 182. Initially, the armature 184 of the solenoid 183 is in its extended position as illustrated with the flexible or resilient valve 185 completely closing the air inlet 182. The solenoid 183 is then operated and the armature 184 which is connected to the flexible valve 185 "peels" the flexible valve off the air inlet 182, exposing a small opening for air to pass through which grows progressively larger as the opening of the valve 185 progresses and the closure member 185 bends or flexes as illustrated. By doing so, only a fraction of the power needed for otherwise opening the valve 185 is required as would otherwise be the case in the event an attempt was made to open all parts of the valve 185 simultaneously from the air inlet 182. Conveniently, the valve 185 is made from a polyurethane material having a thickness of approximately 0.060 inches which has been found to allow suitable flexibility.

As the air inlet 182 is progressively opened, air will pass through the inlet 182 and exit from the openings 181 in the housing 174 in the solenoid air valve 23.

A typical neck jet, 200 (FIG. 11A) is provided with water which is emitted from the water emitting areas 203 of the housing 201 above the surface of the water in the spa 10. The water enters the water inlet 205 and is emitted by the nozzle 212 in a stream which enters internal channel 211 within rotor 204. The water emitting areas 203 are located sequentially about the lower periphery of the housing 201 so that as the rotor 12 rotates, the water is sequentially and downwardly emitted from the water emitting areas 203. The sequential operation is used to create a pulsating effect.

Conveniently, an air intake 213 may also be provided in the neck jet 200 or it may be omitted altogether. Air from the air intake 213 will be sucked into the water stream emitted by the nozzle 212 by the venturi or suction effect created by the increase in velocity of the water being emitted by the nozzle 212.

Conveniently, a code could be provided for manual testing of the GFI 135. This code would be entered on the keys of the optical keypad 135 which would then initiate the test through the microcontroller 10.

While the controller is particularly appliable to a hot tub or spa 10, it is also contemplated that it could be applicable to a shower stall or to a usual bath tub to enhance flexibility in operating such fixtures. In either case, the temperature of the water could be continuously monitored by appropriate transducers and a proximity sensor to sense the presence of a user in the shower stall could be incorporated in the control circuit to assist water saving.

While specific embodiments of the invention have been described, such descriptions should be considered to be illustrative of the invention only and not as limiting its scope as defined in accordance with the accompanying claims.

What is claimed is:

1. A fibre optic controller comprising a keyboard, at least one key mounted in said keyboard, a transmitting fiber extending to each of said keys, a receiving fiber extending from each of said keys, an interface including a light emitting diode to provide radiation to said transmitting fibre and a photodetector to detect radiation received by said receiving fibre, said interface having a male and female member and being positioned between the ends of said receiving and transmitting fibres remote from the ends of the ends of said transmitting and receiving fibres positioned in said keyboard, an electronic controller being operable from said interface, said receiving and transmitting fibers also being mounted in said interface, each of said keys having a reflective surface to reflect light between said transmitting fiber and said receiving fiber, said light emitting diodes and said photodetectors being mounted in one of said male or female members of said interface and said transmitting and receiving fibres being mounted in the other of said male and female member of said interface.

2. A fiber optic controller as in claim 1 wherein said photo transistor provides an electrical signal to said electronic controller and said electronic controller provides an electrical signal to said LED.

3. A fiber optic controller as in claim 2 wherein there are at least two keys, each of said keys having a respective transmitting and receiving fibre mounted therein, each of said transmitting fibres having light transmitted by a light emitting diode and each of said receiving fibres receiving said transmitted light and providing it to a photo transistor, said light emitting diode receiving a signal from said electronic controller and said photo transistor transmitting a signal to said electronic controller.

4. A fiber optic controller as in claim 2 wherein the signal generated by said photo transistor is scanned so as to prevent signals from two or more keys from being simultaneously processed by said electronic controller.

5. A fiber optic controller as in claim 2 and further comprising power components operable from and controlled by said electronic controller.

6. A fiber optic controller as in claim 5 wherein said operating power components are used with a spa and include a water pump.

7. A fiber optic controller as in claim 4 wherein said electronic controller controls at least some components of a bathtub.

8. A fiber optic controller as in claim 4 wherein said electronic controller controls at least some components of a shower.

* * * * *